Figure 1:
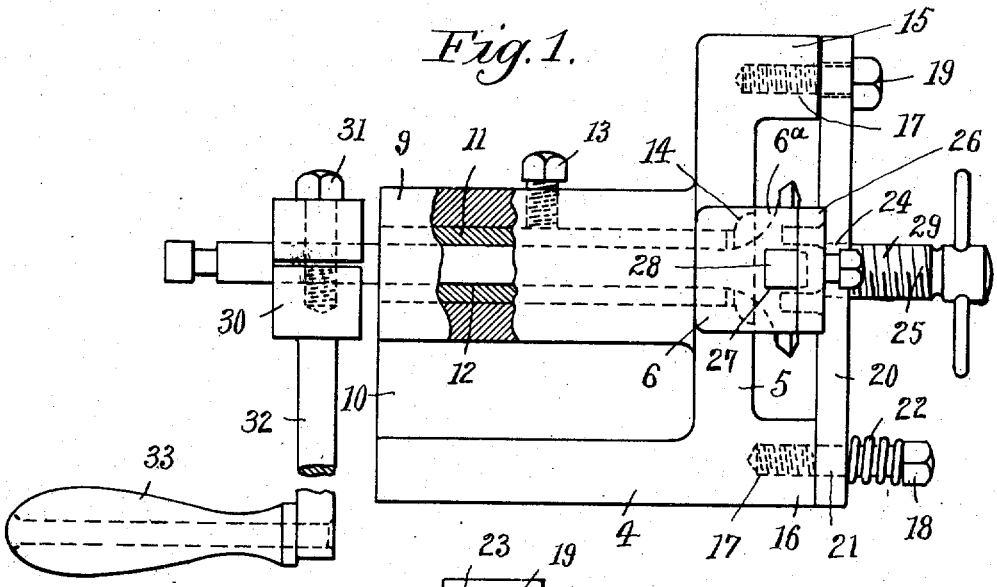

J. SHANNON.

VALVE CUTTING AND RESEATING MECHANISM.

APPLICATION FILED JULY 29, 1914.

Reissued July 4, 1916.

14,162.

WITNESSES:

Richard S Swain

Gladys E. McCollen

INVENTOR

John Shannon

BY

Chamberlain & Newman

ATTORNEYS

THE NORRIS PETERS CO., PHOTO-LITHO. WASHINGTON, D. C.

UNITED STATES PATENT OFFICE.

JOHN SHANNON, OF STONINGTON, CONNECTICUT, ASSIGNOR TO CHARLES H. QUACKENBUSH, OF STAMFORD, CONNECTICUT.

VALVE CUTTING AND RESEATING MECHANISM.

14,162. Specification of Reissued Letters Patent. Reissued July 4, 1916.

Original No. 1,099,316, dated June 9, 1914, Serial No. 789,158. Application for reissue filed July 29, 1914. Serial No. 853,984.

*To all whom it may concern:*

Be it known that I, JOHN SHANNON, a citizen of the United States, residing at Stonington, in the county of New London and State of Connecticut, have invented a new and useful Valve Cutting and Reseating Mechanism, of which the following is a specification.

This invention relates to a valve reseating and cutting mechanism whereby the head of the puppet valve of an internal combustion engine may be seated and trued to the valve seat.

A further object of the invention is to provide a portable apparatus which may be carried in an automobile and which may instantly be called into service to cut and true a valve so as to properly seat and correct the otherwise faulty workings of an internal combustion engine.

Another object of the present invention is to provide a mechanism including cutting knives which may be set at any required angle and at any distance from a central point so as to regulate the depth of cut of the puppet valve and to accommodate different size valves, to further provide spring controlled means bearing downward upon the valve whereby the valve is forcibly held in contact with the cutting knives and the pressure of which may be nicely regulated.

With the foregoing and other objects in view which will appear as the description proceeds the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 2:
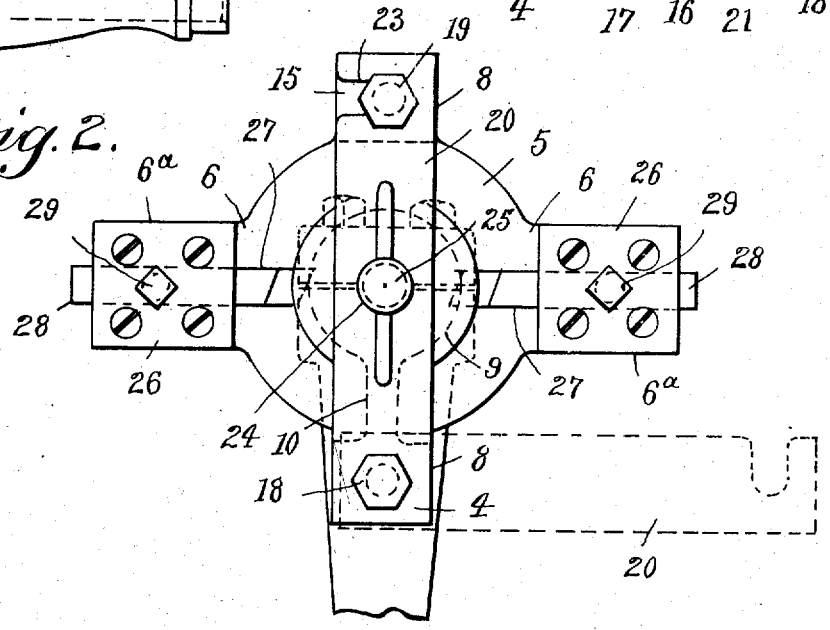

In the drawings accompanying this specification and forming a part thereof, the preferable form of my invention is illustrated, in which:

Figure 1 is a side view in elevation of my improved valve grinding and cutting mechanism with a portion thereof broken away illustrating the bushing which rotatably engages the valve stem. Fig. 2 is a front view thereof.

Referring to the drawings, in which similar reference numerals designate corresponding parts throughout the several views, a frame or body portion is provided and includes a base 4 at the front portion of which is the outstanding front plate 5. The front plate 5 as illustrated in Fig. 2, includes the circular central portion from which extend the radial arms 6—6 and 8—8, it being by one of the latter that the front plate is connected to the base, and thus form an extension of the base, and to which the holding plate is movably connected.

Extending rearwardly from the front plate 5 and approximately central thereof, is the sleeve 9 which is connected to the base 4 by means of the web 10. The sleeve 9 as indicated by its name is hollow and receives a bushing 11 therethrough and which bushing is provided with an aperture 12 extending centrally therethrough which is of a size so as to receive the valve stem therein and effect a snug fit therewith in order to maintain the valve true while it is being rotated for the grinding and cutting thereof. A set screw 13 extends through the side wall of the sleeve and is adapted to engage and rigidly secure the bushing within the sleeve. In this connection it might be mentioned that a number of the bushings 11 are to be provided varying in sizes so as to accommodate valve stems of different diameters. The front plate is provided with a bore 14 extending therethrough which communicates with and is in alinement with the sleeve bore so as to receive the bushing partially therethrough. The front extremity of the bore 14 is enlarged as illustrated in Fig. 1 allowing for the enlargement of the valve at the juncture of the valve head and valve stem.

The radially extending arms 6—6 and 8—8 are provided with forwardly extending lugs so that the cutting knives and holding plate which are secured thereto will be spaced a distance beyond the outer surface of the front plate. The upper and lower lugs 15 and 16 are provided with the threaded apertures 17 for the engagement of the stud bolts 18 and 19 therewith. The holding plate 20 is pivotally connected to the bolt 18 by having an aperture 21 extending therethrough and of somewhat larger diameter than the shank of the bolt 18 which it receives therein, thus allowing for a certain amount of play between the holding plate and the bolt 18. A compression spring 22 is provided upon the shank of the lower bolt 18 and extends between the head thereof and the outer surface of the holding plate 20, so that a resilient force will be exerted upon the holding plate 20 forcing the same into contact with the lug 16, and allowing for the pressure which may be varied by adjustment of the elongated lower bolt 18. The remote end of the holding plate is provided with a transverse slot 23 extending therethrough and for a limited distance thereacross. The slot 23 is adapted to fit beneath the head of the upper bolt 18 and to be forced into contact with the lug 15 thereby when the plate is swung into a closed position. The threaded aperture 24 extends through the holding plate 20 and threadedly receives the wing bolt 25 therein, which wing bolt rests upon and contacts with the extremity of the valve when the same is positioned in contact with the knives and adapted to be cut thereby.

The lugs 6ª upon the laterally extending arms 6—6 are provided with a number of openings which extend therein whereby tool clamping plates 26 are rigidly and at the same time detachably held to the said lugs. The lugs 6ª are provided with grooves 27 extending therethrough in alinement with the center of the plate 5 and which grooves receive the cutting tools 28 therein and which are held so positioned by the clamping plate 26, and the holding set screws 29 which extend through the clamping plate 26 and threadedly engage the latter. The cutting tools as will be readily apparent from a reference to Fig. 2, are provided with beveled cutting ends which conform accurately to the bevel of the valve head and valve seat. The cutting tools may be adjusted and set close to or away from the line of axis of rotation of the valve stem to accommodate different size valve heads.

In order to forcibly rotate the valve stem and therefore the valve head, which latter being in contact with the cutting knives will require some little force, the handle illustrated at the left of Fig. 1 is provided and includes a split head 30 with suitable tightening bolts 31 extending therethrough whereby the said head may be rigidly secured to the valve stem and effect a rotation thereof and due to the fact that the valve stems are usually case hardened there will be little danger of the valve stem being disfigured. An arm 32 projects from the head 30 and at the lower extremity is secured a handle 33 which may gripped for the manual rotation of the valve.

The foregoing described construction provides for a portable device which may be easily carried about to be used in connection with internal combustion engines and more particularly to those which include valves of the puppet type. These valves as is well known are subject to deposits of crystallized carbon upon their contacting faces which spoils the seating qualities of the valve and unless removed, result in the skipping of the engine and consequent loss of power and improper workings thereof. The ordinary method of inserting ground glass or allied abrasive substance beneath the valve head and grinding the same upon the seat, does not remove the deposits of carbon for which purpose the present device has been devised. The valve head when becoming pitted or deposits of carbon being formed thereon, the valve is removed and positioned as illustrated in Fig. 1, with the stem thereof disposed within the bushing valve beyond which the end extends and to which the handle is secured. The valve being so positioned, the holding plate 20 is swung from the dotted position illustrated in Fig. 2 to the one of full lines and clamped into place by the upper bolt. The wing bolt 25 is then screwed into engagement with the top of the valve head and the pressure of the same regulated by forcing the holding plate outwardly and against the compression spring 22. In this connection it might be noted that the upper extremity of the holding plate 20 Fig. 1, is illustrated as being slightly spaced from the upper lug 8 so as to allow for the slight movement thereof. The handle is secured to the valve stem and the rotation of the same brings the valve head into forcible contact with the cutting knives or tool 28 with the result that a fine shaving will be removed from the seating portion of the valve head and all deposits of carbon or imperfections in the valve head will thereby be removed.

From the foregoing it will be seen that the several parts of the device, including the lugs, sleeve, front plate, knives, holding plate, etc., are supported either directly or indirectly upon one common base, and that the holding plate is movably connected to a lug or extension of the base and in a way to be secured in position in front of the face of the valve head and in line with the axis of the valve stem when rotatably supported in the bushing of the valve.

Having thus fully described my invention, what I claim is:—

1. In a valve truing mechanism, the combination of a front plate provided with a bore extending therethrough and adapted to rotatably receive a valve stem therein, a cutting knife adjustably and rigidly secured to said front plate juxtaposed to said bore, a holding plate resiliently secured to the said front plate, means extending through said holding plate engaging the valve head and adapted to force the same into contact with said cutting knife, and means for holding said valve stem true during the rotations thereof.

2. In a mechanism of the class described, the combination of a body portion including a front plate provided with an aperture extending therethrough, a sleeve projecting rearwardly from the said plate and communicating with said plate aperture, knife holding lugs carried by said plate, a cutting knife adjustably secured thereto, said plate and sleeve adapted to rotatably secure a valve of the puppet type therein, a holding plate rotatably and resiliently secured to the body portion in front of said first mentioned plate and removable above the said valve, and means adapted to contact with said valve to force the same into yielding contact with said cutting knife.

3. In a valve cutting and seating mechanism, the combination of a body portion including a front plate provided with an aperture therethrough, a sleeve extending rearwardly from said front plate in alinement with said aperture and adapted to rotatably receive a valve stem therein with the valve head thereof projecting in front of said plate, said front plate provided with upstanding lugs at the side thereof, cutting knives adjustably secured to the upstanding lugs and arranged to contact with the said valve head, said front plate provided with outstanding lugs at the top and bottom thereof, a plate rotatably and resiliently secured to one of said lugs, locking means secured to the other of said lugs adapted to hold said holding plate in locked position extending above the valve head, means extending through said holding plate adapted to contact with the said valve head to force the said valve head into yielding contact with the said cutting knives, and means for regulating the pressure and force of contact between said valve head and said cutting knives.

4. In a valve truing and seating cutter, the combination of a body portion including a front plate provided with an aperture extending therethrough and with a sleeve projecting outwardly in alinement with the said aperture, said sleeve and aperture adapted to rotatably receive a valve of the puppet type therein, said front plate provided with outstanding lugs at the sides thereof, said lugs provided with means for adjustably engaging cutting tools and holding the same rigidly secured thereto, cutting knives secured to said lugs and held a distance above the said plate, said plate provided with outstanding lugs at the upper and lower portion thereof, a holding plate rotatably and resiliently secured to one of said lugs, means upon the other of said lugs adapted to hold said plate in a locked position above said plate aperture, means extending through said holding plate above said front plate aperture adapted to contact with the valve head and resiliently force the same into contact with said cutting knives, means for varying the force of contact between said valve head and cutting knives, and means securable to the projecting end of said valve stem for the manual rotation thereof.

5. In a valve seating and cutting mechanism, the combination of a frame including a base and an upstanding front plate carried thereby, a rearwardly extending sleeve carried by said front plate and a web extending between said sleeve and said base for the bracing thereof, said front plate provided with an aperture extending therethrough communicating with the bore of said sleeve, means insertible within said sleeve for rotatably securing a valve stem therein with the valve head thereof projecting in front of said front plate, said front plate provided with outstanding lugs, cutting knives secured to said outstanding lugs and spaced a distance from said plate, said plate provided with a second pair of outstanding lugs, a holding plate resiliently and rotatably secured to said lugs and extending above the said valve head, and a wing bolt extending through said holding plate and contacting with the said valve head adapted to resiliently force the same into contact with the said cutting knives.

6. A valve cutting and seating mechanism comprising a front plate provided with a bore extending therethrough and adapted to rotatably receive a valve stem therein, a cutting knife adjustably and rigidly secured to said plate, a holding plate resiliently secured to said front plate, means extending through said holding plate adapted to engage a valve head and to force the same into contact with said cutting knife.

7. A valve cutting and seating mechanism, comprising a base, a sleeve upon the base and including a flat face front plate and a bore extending therethrough and adapted to rotatably receive a valve stem therein, an adjustable and rigidly supported cutting knife arranged forward of the first plate, a holding plate pivotally supported upon one member of the base and detachably connected with another member, and means carried by the holding plate adapted to engage a valve head to force its face into contact with said cutting knife and in a way to not engage the front plate.

8. A valve cutting and seating mechanism, comprising a base having a flat front plate and a series of projected lugs, a removable sleeve with a bore extending therethrough, an adjustable cutting knife mounted in one of the said lugs and forward of the plate, a holding plate pivotally supported upon another of the lugs and adapted to be detachably secured to one of said lugs, and means carried by the holding plate to engage a valve to force the same into contact with said cutting knife.

9. A valve cutting tool comprising a base, supporting means upon said base for rotatably supporting the stem of a valve, blocks carried by the base and symmetrically arranged with respect to the axis of rotation of the valve, a tool carried by one of said blocks, a bar movably connected with one of said blocks, means for connecting said bar with another of said blocks and means adjustably carried by said bar for engaging the head of the valve to hold it in engagement with the tool.

10. A valve cutting tool comprising a base, valve stem supporting means positioned upon said base, bearing means contained in said supporting means for rotatably supporting the stem of a valve, blocks carried by said base and symmetrically arranged with respect to the axis of rotation of the valve, one of said blocks being provided with a cutting tool positioned forward of the supporting means and with a holding means for said tool, a cross bar movably connected with one of said blocks, means for releasably connecting said bar with another of said blocks, and means adjustably carried by said bar for engaging the head of a valve to hold it in engagement with the cutting edge of the tool.

In testimony that I claim the foregoing as my own, I have hereto affixed my signature in the presence of two witnesses.

JOHN SHANNON.

Witnesses:
F. O. Grandy,
W. A. Breed.

Copies of this patent may be obtained for five cents each, by addressing the "Commissioner of Patents, Washington, D. C."